(12) United States Patent
Minami et al.

(10) Patent No.: US 6,212,237 B1
(45) Date of Patent: Apr. 3, 2001

(54) MOTION VECTOR SEARCH METHODS, MOTION VECTOR SEARCH APPARATUS, AND STORAGE MEDIA STORING A MOTION VECTOR SEARCH PROGRAM

(75) Inventors: Toshihiro Minami; Toshio Kondo, both of Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/094,863

(22) Filed: Jun. 15, 1998

(30) Foreign Application Priority Data

Jun. 17, 1997 (JP) .................................................. 9-159964

(51) Int. Cl.[7] ...................................................... H04N 7/12
(52) U.S. Cl. .......................................................... 375/240.16
(58) Field of Search ..................................... 348/402, 407, 348/416

(56) References Cited

U.S. PATENT DOCUMENTS

| 5,208,667 | * | 5/1993 | Saunders | 348/452 |
| 5,400,087 | * | 3/1995 | Uramoto et al. | 348/402 |
| 5,473,379 | * | 12/1995 | Horne | 348/416 |
| 5,778,099 | * | 7/1998 | Suzuki | 382/239 |

FOREIGN PATENT DOCUMENTS

| 2-62179 | 3/1990 | (JP) . |
| 5-46769 | 2/1993 | (JP) . |
| 7-143492 | 6/1995 | (JP) . |
| 9-70046 | 3/1997 | (JP) . |

OTHER PUBLICATIONS

Kanda et al., "Wide Area MV Search Based on Down--Sampled Image," The Image Media Processing Symposium '96 in Japan, Document. No. IMPS96, 1–8.22.

* cited by examiner

Primary Examiner—Chris S. Kelley
Assistant Examiner—Allen Wong
(74) Attorney, Agent, or Firm—Pennie & Edmonds LLP

(57) ABSTRACT

A method for searching for a motion vector in a moving-video image about a template to be evaluated, by evaluating motion by a predetermined operation between the template and a group of pixel blocks of the same size as the template, which is comprised of a first step for assuming a first area having a size of more than one pixel block, and for performing a motion vector searching operation between pixel values of pixels consisting of the first area and pixel values of pixels consisting of the template; and a second step, if the operational result satisfying a predetermined condition, for obtaining a motion vector from the operational result, if the operational result not satisfying the predetermined condition, for assuming a second area of a size completely to cover the first area, and for performing a motion vector searching operation between pixel values of pixels consisting of the second area, and pixel values of pixels consisting of the template, to obtain a motion vector.

35 Claims, 9 Drawing Sheets

MOTION VECTOR SEARCH METHODS, MOTION VECTOR SEARCH APPARATUS, AND STORAGE MEDIA STORING A MOTION VECTOR SEARCH PROGRAM

BACKGROUND OF THE INVENTION

1. Field of the Invention

This invention relates to a technique for searching for a motion vector, which expresses from which position in other moving-video images a pixel block in a certain moving-video image has moved, being used in video-encoding algorithms, such as MPEG1, MPEG2, and H261, H263, etc., which are international standard.

This specification is based on the patent application No. Hei 9-159964 filed in Japan, the contents of which is incorporated herein by reference.

2. Description of the Related Art

Hereafter, with reference to some typical diagrams, various kinds of conventional motion vector searching methods will be explained. FIG. 1 shows exemplarily a template 1 which is the object which is searched for a motion vector, and a search area 2 which is a search range of the motion vector. In FIG. 1, the template 1 is a pixel block in a certain image and the search area 2 is a pixel block in another image, which is larger than the template 1. The symbols Δ3 denote the pixels which comprise the template 1, and the symbols O4 are the pixels which comprise the search area 2.

In FIG. 1, since a template 1 is superimposed on the search area 2, the pixels O4 of the overlapped part in the search area is not shown. In addition, hereafter, the unit of the number of horizontal pixels is defined as a "pixel," and the unit of the number of perpendicular pixels is called a line. Therefore, the template 1 shown in FIG. 1 is 4-pixel× (by) 4-line, and the search area 2 is 11-pixel×11-line.

Now, a "whole searching method," which is a first prior art for searching for a motion vector to the template 1, will be explained. By this technique, areas of 4-pixel×4-line of the same size with the template 1 are extracted sequentially by one from the search area 2. Between the pixel value of each pixel of this extracted area, and the pixel value of the corresponding pixel in the template 1, sequentially, an absolute difference value or a square difference value, etc., is calculated, and the plural sum-totals of the calculated values for the pixels are calculated for each extracted area.

That is, in the search area 2, over the upper left to the lower right, when the area of 4-pixel×4-line is shifted by 1 line or 1 pixel at a time, since the search area 2 has 11-pixel×11-line, the total 8×8=64 areas are the objects for the operation between the templates 1 (the operation, which calculates a absolute difference value, a square difference value, etc.). And, the motion vector is obtained from the area where the operational result has the minimum result, where this template 1 has moved from.

In FIG. 1, when (0, 0) is set as the motion vector of the pixel block of the position corresponding to the template 1, the range of the value which a motion vector can take is "−4−+3" in both the horizontal direction and the perpendicular direction. Because the template 1 can be transferred to one side by 4 pixels (or 4 lines) and can be transferred to the other side by 3 pixels (or 3 lines), in the horizontal direction and the perpendicular direction, respectively, as understood by referring to FIG. 1.

For example, if the operational value (a sum of absolute difference values, a sum of square difference values, etc.) of an area 5 is the minimum, as shown in FIG. 1, the motion vector is (2, 2). The above is description of the principle to obtain a motion vector. With reference to the typical diagram of FIG. 2, the generalized of this motion vector search is explained.

If the size of a template 6 in a certain image is defined as a-pixel×b-line, the size of a search area 7 in another image is defined as c-pixel×d-line (c≧a, d≧b), and the motion vector of the pixel block at the center of the search area 7 which corresponds to the template 6 is defined as "(0, 0)," the ranges of the values which a motion vector can take are "−(c−a)/2 . . . (c−a) /2+1 in the horizontal-direction, and −(d−b)/2 . . . (d−b), 2+1 in the perpendicular-direction," an evaluation of "(c−a+1)×(d−b+1)" motion vectors. In FIG. 2, the motion vector of the block 8 at the upper-left edge is ((c−a)/2−1 (d−b)/2−1), and the motion vector of the block 9 at the lower-right edge is (−(c−a)/2, −(d−b)/2). Hereinafter, as an example, only the case where a sum of absolute difference values is used as a motion vector searching operational expression for obtaining a motion vector will be explained. Of course, other evaluation formulas, such as a sum of square difference values can be also used as the operational formulas.

Now, if such whole searching methods are adopted, in order to search the search area 2 of FIG. 1, it is required to calculate absolute difference values at 64×16=1024 times (by extracting 64 areas, wherein each area consists of 16 pixels). Therefore, the number of operations becomes huge. On the other hand, in order to cut down the number of operations, as a second prior art, a different searching method was proposed, wherein, as first, a motion is evaluated on a reductional image obtained by subsampling, next, a search is conducted only in a narrow range by using the motion vector obtained as the evaluation result as initial value.

With reference to the typical diagram of FIG. 3, this technique will be explained. FIG. 3 exemplarily shows the pixels which are subsampled, when subsampling one pixel per 2-pixel×2 lines. The symbol ▲10 and the symbol ●11 show the pixels by which subsampled from the template 1 and the search area 2, respectively.

First, when obtaining reductional images by subsampling and searching the range of "−1 . . . +1" of the neighborhood of the initial value on the original image, 16×4=64 times of the calculation of absolute difference values (by extracting 16 areas wherein each area consists of 4 pixels) are required on the reductional images, and next 9×16=144 times of absolute difference values are required on the original image. Therefore, the sum total of the number of operations becomes 208 times (64+144 times), and the number of operations is sharply cut down compared with the whole searching methods. Such a motion vector searching method using such a reductional image is described, for instance, in "N. Hayasi, T. Kitui, L. Tamitani, H. Honma, Y. Ooi, T. Miyazaki, K. OobuchI;" "A bidirectional motion compensation LSI with a compact motion estimator," IEICE Trans. Electron, E78-C, 12, pp.1682–1690, December 1995, etc. In order to realize the vast searching range as an extension of the above-mentioned technique, it can be also thought that searching is conducted on reductional images whose resolution is further lowered by subsampling one pixel per 4-pixel×2-line one pixel per 4-pixel×4-line.

A moving-video image consists of two or more images which continued in a time domain. In case that a motion vector is needed to be obtained between the images which are separated in a time domain, the search must be conducted in a relatively wide range since the range to be searched becomes wide. In such a case, in order to cut down the number of operations, the telescopic-search method is proposed as the third prior art.

With reference to the typical diagram in FIG. 4, this telescopic-search method will be explained. In FIG. 4, images 12, 13, 14, and 15 are 4 images which continue in a time domain, the image 15 is the present image, and the image 12, the image 13, and the image 14 are the previous images of 3 screens before, 2 screens before, and 1 screen before, respectively. A rectangle block 16 moves to the image 13 from the image 12 by a motion vector mv1. Similarly, the block 16 moves to the image 14 from the image 13 and moves to the image 15 from the image 14 by motion vectors mv2 and mv3, respectively. At this time, the motion vector of the rectangle block 16 to the image 15 from the image 12 is "mv1+mv2+mv3." By the telescopic-search method, in order to obtain the motion vector from the image 12 to the image 15, an area 17 in the image 14 is searched first, using the rectangle block 16 in the image 15 as a template, and the motion vector mv3 is detected. At this time, the motion vector of the center of the area 17 is (0, 0).

Next, by searching an area 18 in the image 13, the motion vector mv2 is detected. When taking the motion vector from the image 14 to the image 15 of the rectangle block 16 into consideration, the motion vector of the center of the area 18 is mv3. Finally, by searching an area 19 in the image 12, and the motion vector mv1 is detected. When also taking the motion vector from an image 13 to the image 14 of the rectangle block 16 into consideration, the motion vector of the center of an area 19 is "mv3+mv2."

Thus, in this third prior art, the searching for a motion vector is conducted in narrow areas among adjoining images, and the searching for the motion vector in the narrow area in the following adjoining image is conducted by using the detected vector as an initial value, in order to search for the motion vector between the images which separate in a time domain. In addition, in order to cut down the number of operations, combining the sampling method and the telescopic-search method was also proposed. Such a method is described in K. Suguri, T. Minami, H. Matuda, R. Kusaba, T. Kondo, R. Kasai, T. Watanabe, H. Sato, N. Shibata, Y. Tashiro, T. Izuoka, A. Shimiz, H. Kotera, "A real-time motion estimation and compensation LSI with wide search range for MPEG2 video encoding, "IEEE J.Solid-State Circuits, vol. 31, no. 11, pp.1733–1741 November 1996."

However, although a whole searching method whose searching accuracy was the highest, it was not possible accurately to obtain a motion vector even by that method. Hence, if searching the wide searching range in order to improve the quality of the image of a big motion, when the image of a small motion and the image of a big motion are intermingled, it causes incorrect detections in the image of a small motion and the probability that a motion vector cannot be correctly obtained becomes high.

Moreover, even when a template and the block of its perimeter are the images which carry out a transaction (a parallel transfer) in a fixed direction, incorrect detection of a motion vector happens because of a noise, etc. Therefore, there was a problem that the motion vector of the template and the block of its perimeter did not become the same, as a result of search processing (hereinafter, it is expressed as "motion vector varying (or dispersing)," suitably). The dispersion in this motion vector causes a decline in the coding efficiency, and will cause degradation of the quality of the image of a moving-video image.

When a subsampling method or a telescopic-search method is used in order to cut down the number of operations and to make the search range wider furthermore, by the former, a decline in the detection accuracy by pixel thinning out is caused inevitably, and by the latter, once incorrect detection occurs, in order to perform the following search based on the motion vector which is incorrect-detected, an exact motion vector cannot be obtained. By both, the probability that the dispersion in motion vectors occurs was still large than whole searching methods.

SUMMARY OF THE INVENTION

[0020]

This invention is provided in order to solve such subjects for the prior arts. It is an object of the present invention to provide a means to search for a motion vector accurately. More specifically, it is an object of the present invention to provide a means to search a motion vector accurately, even if it is the case that the area of a big motion and the area of a small motion are intermingled in a moving-video image, whereby for the area of a small motion, the search range is narrowed so as to suppress the dispersion among motion vectors, and for in the area of a big motion, the search range is widened.

An aspect of the present invention is a method for searching for a motion vector in a moving-video image about a template to be evaluated, by evaluating motion by a predetermined operation between the template and a group of pixel blocks of the same size as the template, which is comprised of a first step for assuming a first area having a size of more than one pixel block, and for performing a motion vector searching operation between pixel values of pixels consisting of the first area and pixel values of pixels consisting of the template; and a second step, if the operational result satisfying a predetermined condition, for obtaining a motion vector from the operational result, if the operational result not satisfying the predetermined condition, for assuming a second area of a size completely to cover the first area, and for performing a motion vector searching operation between pixel values of pixels consisting of the second area, and pixel values of pixels consisting of the template, to obtain a motion vector.

Another aspect of the present invention is a method for searching for a motion vector in a moving-video image about a template to be evaluated, by evaluating motion by a predetermined operation between the template and a group of pixel blocks of the same size as the template, which is comprised of a first step for obtaining a motion vector by assuming a first area having a size of more than one pixel block and including a pixel block of a motion vector of (0, 0), and by performing a motion vector searching operation, using a vector (0, 0) as an initial value, between pixel values of pixels consisting of the first area and pixel values of pixels consisting of the template, and for obtaining another motion vector by performing the motion vector searching operation for a third area, using a vector obtained for any one of templates adjacent to the template to be evaluated as an initial value; and a second step, if one of the two operational results, being selected by a predetermined rule, satisfying a predetermined condition, for obtaining a motion vector from the operational result, if the operational result not satisfying the predetermined condition, for assuming a second area of a size completely to cover the first area and the third area, and for performing a motion vector searching operation between pixel values of pixels consisting of the second area, and pixel values of pixels consisting of the template, to obtain a motion vector.

Here, the operation to calculate the sum of absolute difference values and the sum of square difference value which are well-known algorithms may be used as the motion vector searching operation. These motion vector searching methods can be realized, for example, by memorizing into a storage medium as a program, and by making a computer read and perform this program.

In that case, the computer can be comprised by CPU (central processing unit) and RAM, which performs operation according to the program stored in the storage medium, such as optical storage media (CDROM, DVDROM, etc.), magnetic storage media (a flexible disk, etc.), semiconductor storage media (an IC card, ROM, etc.), optical magnetic storage media (MO, etc.)

Another aspect of the present invention is an apparatus for searching for a motion vector in a moving-video image about a template to be evaluated, by evaluating motion by a predetermined operation between the template and a group of pixel blocks of the same size as the template, which is comprised of a memory section for memorizing a moving-video image; and a search processing section for performing motion vector search with reference to memory contents of the memory section, wherein the search processing section is comprised of section for assuming a first area having a size of more than one pixel block, and for performing a motion vector searching operation between pixel values of pixels consisting of the first area and pixel values of pixels consisting of the template, and section, if the operational result satisfying a predetermined condition, for obtaining a motion vector from the operational result, if the operational result not satisfying the predetermined condition, for assuming a second area of a size completely to cover the first area, and for performing a motion vector searching operation between pixel values of pixels consisting of the second area, and pixel values of pixels consisting of the template, to obtain a motion vector.

Another aspect of the present invention is an apparatus for searching for a motion vector in a moving-video image about a template to be evaluated, by evaluating motion by a predetermined operation between the template and a group of pixel blocks of the same size as the template, which is comprised of a memory section for memorizing a moving-video image; and a search processing section for performing motion vector search with reference to memory contents of the memory section, wherein the search processing section is comprised of section for obtaining a motion vector by assuming a first area having a size of more than one pixel block and including a pixel block of a motion vector of (0, 0), and by performing a motion vector searching operation, using a vector (0, 0) as an initial value, between pixel values of pixels consisting of the first area and pixel values of pixels consisting of the template, and for obtaining another motion vector by performing the motion vector searching operation for a third area, using a vector obtained for any one of templates adjacent to the template to be evaluated as an initial value, and section, if one of the two operational results, being selected by a predetermined rule, satisfying a predetermined condition, for obtaining a motion vector from the operational result, if the operational result not satisfying the predetermined condition, for assuming a second area of a size completely to cover the first area and the third area, and for performing a motion vector searching operation between pixel values of pixels consisting of the second area, and pixel values of pixels consisting of the template, to obtain a motion vector.

This motion-vector searching apparatus may comprise a control means (control section) to conduct drive-controls of the search processing means, and to output the obtained motion vector.

DESCRIPTION OF PREFERRED EMBODIMENTS

Figure 5:
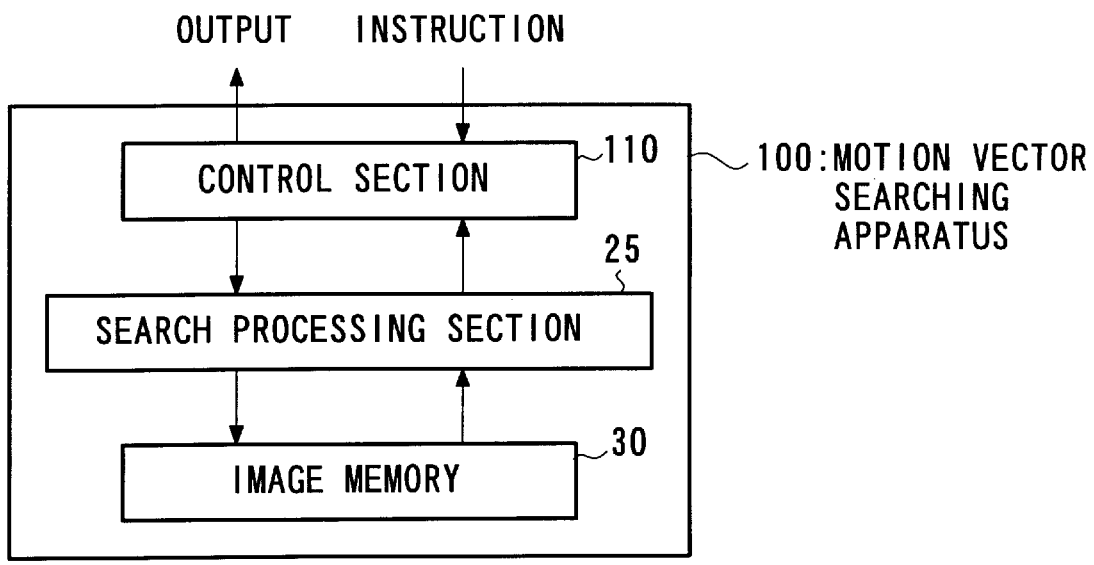
FIG. 5 is a block diagram of a motion-vector searching apparatus showing a preferred embodiment of the present invention.

Hereafter, preferred embodiments of the present invention will be explained, referring to the drawings. FIG. 5 is a block diagram showing an example of a configuration of a motion-vector searching apparatus 100. This motion-vector searching apparatus 100 has an image memory 30 for memorizing a moving-video image, a search processing section 25 which performs the searching for a motion vector, and a control section 110 which carries out a drive control to the search processing section 25, and externally outputs an obtained motion vector from the apparatus, based on given instructions.

This motion-vector searching apparatus 100 can be realized by only hardware that is comprised by LSI using a semiconductor technology. Moreover, it is also possible to be realized by electrical devices, for example, such as storage media like a ROM which stores an operational program, a CPU (central processing unit) which performs operation by following the operational program, a RAM which has a working area and memory area, etc.

That is, it is also possible that this motion-vector searching apparatus 100 is realized by one computer system which operates according to a program which is memorized in a storage medium.

Hereafter, a preferred embodiment which performs the motion vector search using this motion-vector searching apparatus 100 will be explained.

First Preferred Embodiment

Figure 6:
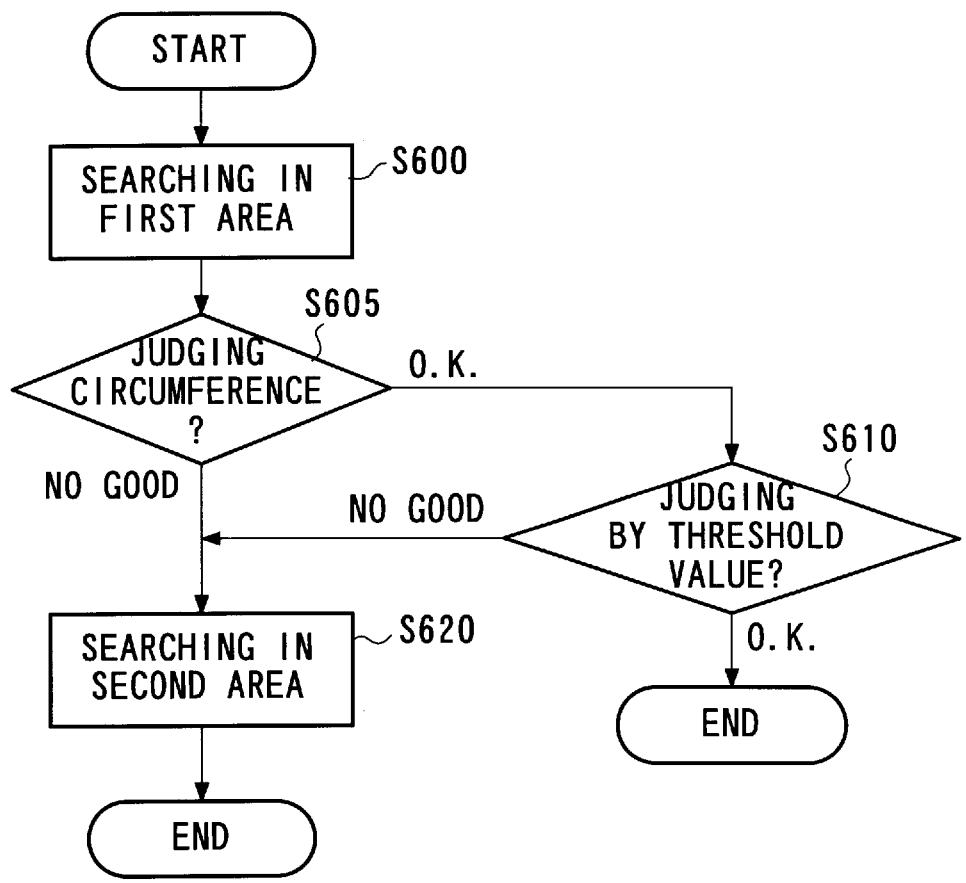
FIG. 6 is a flow chart which shows the precessing in a first preferred embodiment.

FIG. 6 is a flow chart which shows a processing related to the first preferred embodiment, and first, the outline of the operation will be explained with this flow chart, and next, the processing related to this preferred embodiment will be explained with a typical diagram.

First, the search processing section 25, which is started and controlled by the control section 110 that is provided of instructions, searches, in step S600, for a motion vector in a first area, which has a size containing one or more pixel blocks of the same size as a template, with reference to the information on the moving-video image which the image memory 30 memorizes. In this search, based on the pixel values of the pixels which comprise a template and the pixel values of the pixels which comprise the first area, absolute difference values are calculated, or it is investigated if the pixel block defined by the obtained motion vector does not exist at the circumference section of the first area.

And, in step S605, the search processing section 25 performs the circumference section judging, and when the pixel block shown by the obtained motion vector does not exist in the circumference section of the first area (O.K.), it progresses to step S610 and, in the other case (No Good), progresses to step S620.

When it is judged that a sum of absolute difference values is smaller than a threshold value which it determined beforehand at step S610 (O.K.), the search processing section 25 outputs the motion vector which is determined based on the position of the pixel block corresponding to this sum of absolute difference values as a movement origin, through the control section 110, it ends the processing, and, in the other case (No Good), it progresses to step S620. At step S620, in the second area which completely covers the first area, the search processing section 25 searches for a motion vector with reference to the information on the moving-video image which the image memory 30 memorizes. The motion vector for which it was searched by the search processing section 25 is outputted outside to the apparatus through the control section 110. Furthermore, when the sum of absolute difference values of the motion vector obtained at step S620 is larger than the second threshold value which is defined beforehand, the signal that shows a motion vector was undetectable is outputted through the control section 110. In addition, of course, another configuration is also possible, wherein after searching the first area at step S600, the threshold-value judging at step S610 is performed immediately, without performing the judging for the circumference section (S605). In this case, although some quality of the image degrades, the number of operations decreases. As for this, the same can be applied to the second shown below, the third, and fourth preferred embodiments.

Figure 7:
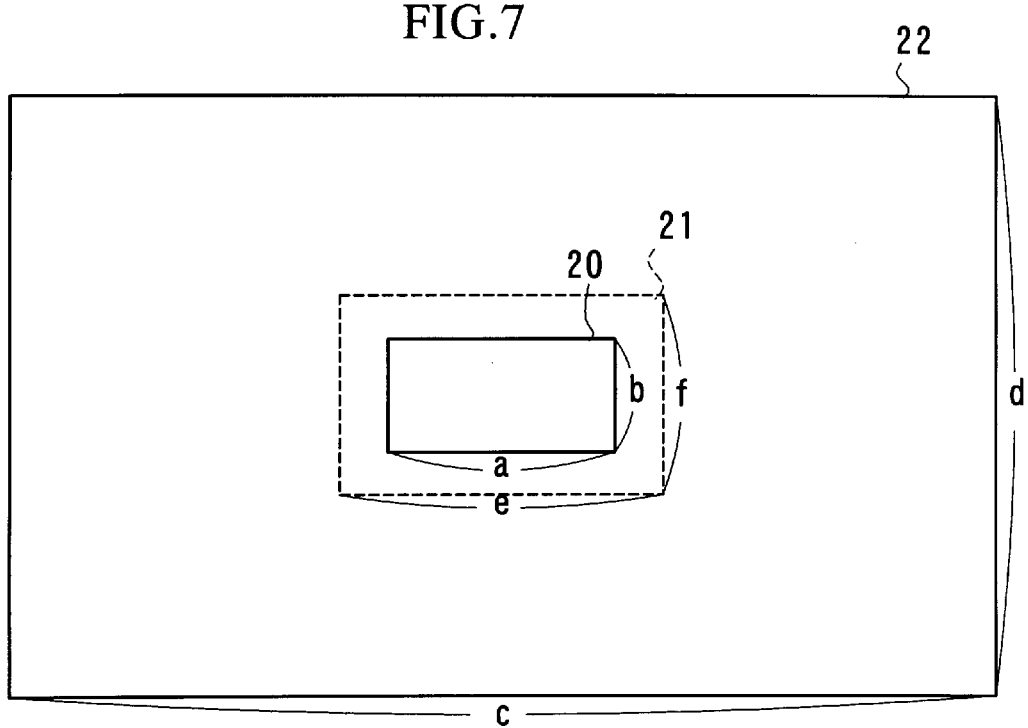
FIG. 7 is a typical diagram concerning the first preferred embodiment.

With reference to the typical figure of FIG. 7, the above-mentioned processing will be explained. An area 21 is a narrow area (the first area) of e pixels×f lines (c≧e≧a, d≧f≧b) centering the block 20, therein, of the same size (a pixels×b lines) as the template of the motion vector=(0, 0). An area 22 is a large area (the second area) of c pixels×d lines which includes an area 21 centering the block 20 of the motion vector=(0, 0) therein. However, when c=e and d=f coincide, this case shall be omitted since both areas are identical.

In the first preferred embodiment, first, a motion vector is searched for in the narrow area 21. As the result, if the pixel block shown by the detected motion vector does not exist in the circumference section (meaning the edge of the area 21; the detailed definition of this word in this specification will be described) of an area 21, and the result of the searching operation for this motion vector is smaller than a predetermined threshold value (i.e., a similar degree (likelihood) is higher than a predetermined threshold value), the searching is ended, defining this motion vector as the right vector. In addition, although, in many cases, a threshold value is set up before starting the search, a threshold value can also be changed in the middle of the search.

Next, when the pixel block shown by the motion vector exists in the circumference section of the area 21 or when the operational result for the motion vector is larger than a predetermined threshold value (when the likelihood is lower than a predetermined threshold value), the area 22 is searched for the first time. In addition, the reason why the area 22 is surely searched when the pixel block shown by the motion vector exists in the circumference section of the area 21, is a high possibility of the right motion vector existing out of the area 21.

Figure 1:
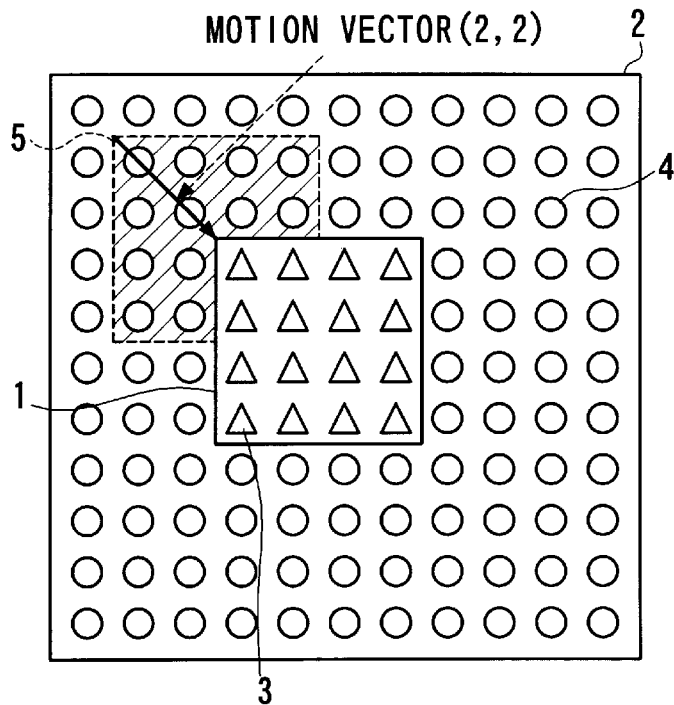
FIG. 1 is a typical diagram for explaining a prior art.
Figure 2:
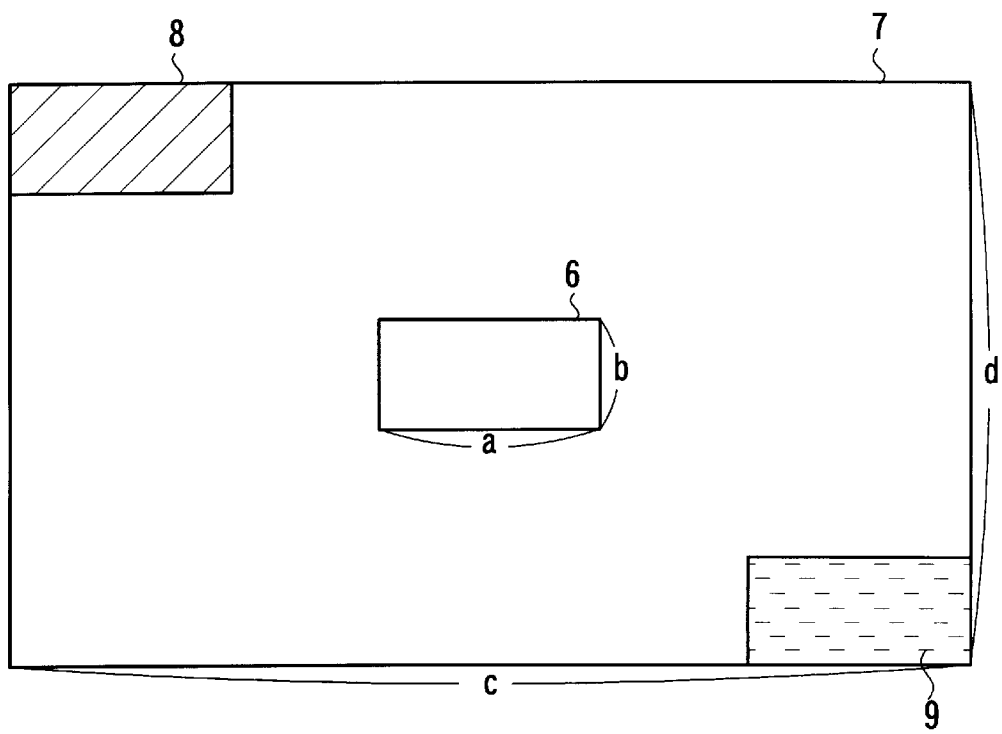
FIG. 2 is a typical diagram for explaining a prior art.
Figure 3:
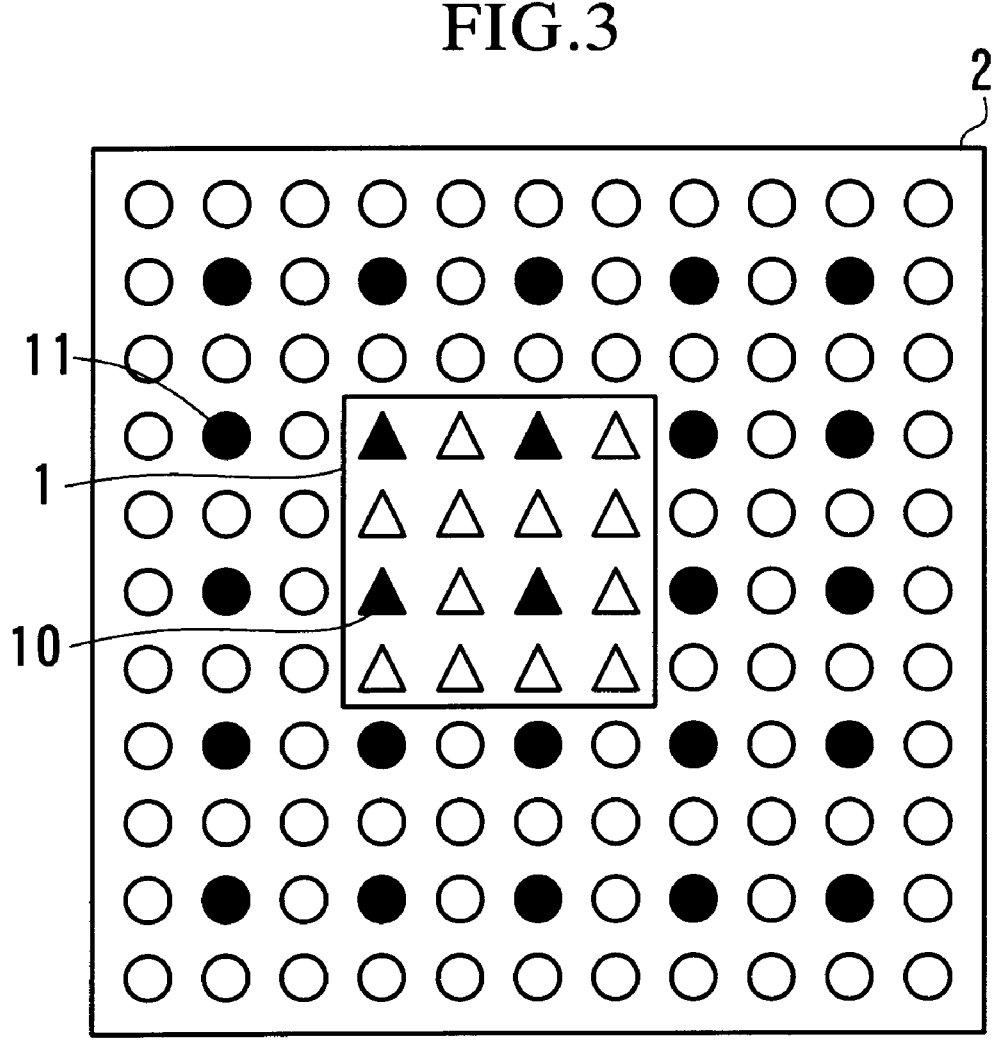
FIG. 3 is a typical diagram for explaining a prior art.
Figure 4:
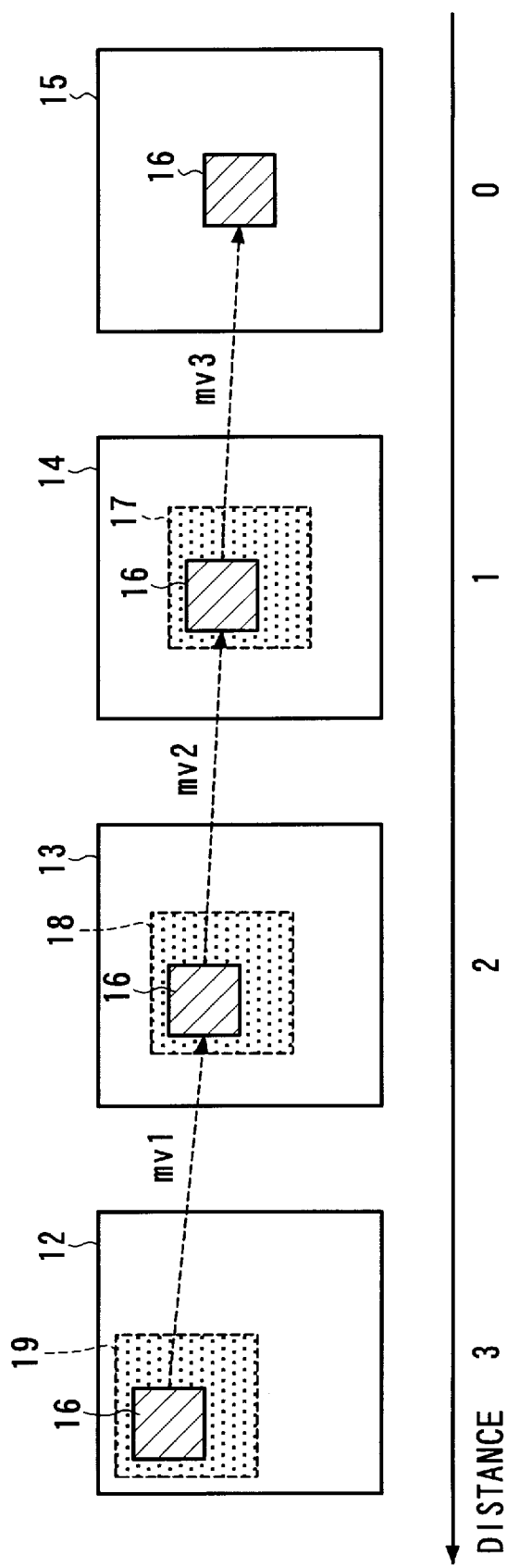
FIG. 4 is a typical diagram for explaining a prior art.
Figure 8:
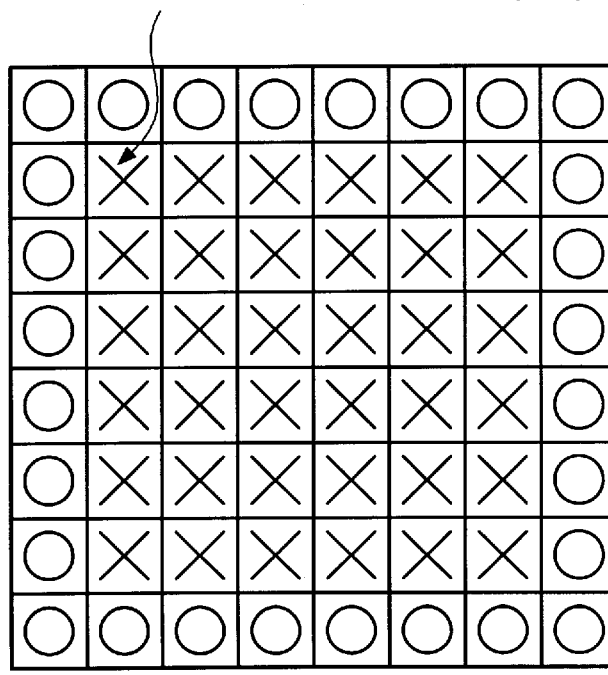
FIG. 8 is a diagram which explains a preferred embodiment to the present invention.

Here, with reference to FIG. 1 and FIG. 8, the definition that the pixel block shown by the motion vector exists in the circumference section of the area will be explained. Since the size of a template is 4-pixel×4-line in FIG. 1, the search range of 11-pixel×11-line is divided into 64 pixel blocks, and 8×8=64 motion vectors, as candidates, (expressed by O and x in FIG. 8) are obtained in a motion vector space by the absolute-difference-value operation using the pixel values between each pixel block and the template. In this case, when the motion vector (expressed by O in FIG. 8) is detected in the circumference section among motion vector spaces, it is called that the pixel block exists in the circumference section of the area. Since there is a high possibility that the more optimum motion vector exists outside the area (i.e., the sum of absolute difference values has a smaller value outside the area), when a motion vector is detected in the circumference section, the outside of the first area is also searched.

Since according to this first preferred embodiment a motion vector is detected in the area 21 when the motion of an image is small, a motion vector does not vary by avoiding searching the large range beyond by necessity. Moreover, since searching the area 22 begins after it is confirmed that a motion vector is undetectable in the area 21, a big motion is also detectable.

Furthermore, since it requires only the search of the narrow range when a motion vector is detected in the area 21, the number of operations is reducible. Therefore, it also enables to configure the motion-vector searching apparatus 100 as the composition with an electric-power saving function.

What is necessary is just to use a whole searching method or a subsampling method for searching the first area, and to use, for searching the second area, a subsampling method, a telescopic searching method, or both in combination, in this first preferred embodiment. Of course, any search algorithm may be used. In addition, in the above-mentioned preferred embodiment, the following effects can be obtained by especially using the subsampling method or the telescopic searching method for searching the second area and using the whole searching method for searching the first area. Namely, by searching the first area in a narrow range in detail by the whole searching method in single pixel accuracy, and by searching the second area in the wide range roughly by the subsampling method or the telescopic-search method, an exact motion vector can be detected by the detailed search of the narrow range in the search of the first area if the motion of an image is small, and a motion vector can be detected by the search of the wide range in the search of the second area if the motion of an image is big. It, therefore, can prevent a large decline in the quality of the image. If the searching accuracy is made coarse, since the number of operations for the search will decrease, the size of hardware can be reduced. Although the quality of the image deteriorates sharply if the searching accuracy is simply made coarse, the present invention can prevent a large fall of the quality of the image since the area where the possibility that a motion vector exists is high is searched in detail. In addition, in the first preferred embodiment, it is not a problem at all to form the template as arbitrary forms such as an ellipse, a diamond shape, etc., concerning the enforcement of the present invention. Similarly, it is also possible not to restrict the form of the first and the second areas as a rectangle, but to use arbitrary forms. For the first area, what is necessary is just to make the size thereof be completely contained in the second area, and completely contain the same size as the template.

Second Preferred Embodiment

This second preferred embodiment has a feature in the point of first, performing a motion vector prediction, and next, performing a motion vector search, using this as initial value.

Figure 11A:
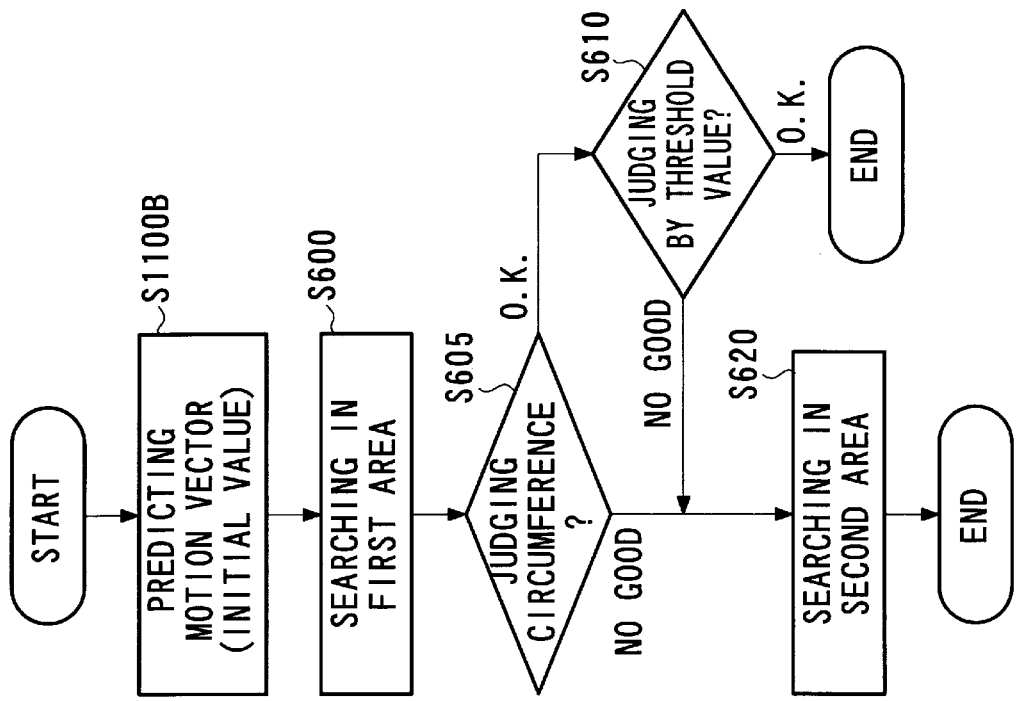
FIGS. 11A and 11B are flow charts which show the precessing in the second and a third preferred embodiments of the present invention.

FIG. 11A is a flow chart which shows such processing related to the second preferred embodiment, and first, the outline of operations will be explained by this flow chart, and the processing related to this preferred embodiment will be explained in a typical diagram after that.

First, at step S1100, the control section 110 which received instructions carries out drive control of the search processing section 25, and performs a motion vector prediction. After that, the processing at steps S600, S605, S610, and S620 does not have any different point from the processing at the same steps in FIG. 6.

Figures 9, 10:
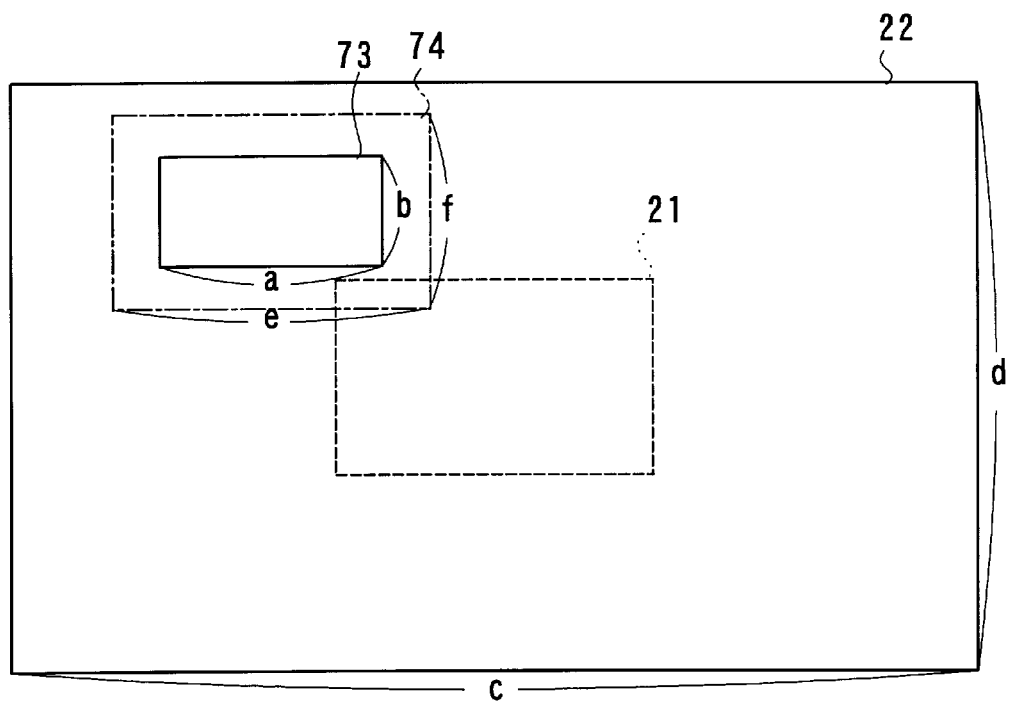
FIG. 9 is a typical diagram of a second preferred embodiment of the present invention.
FIG. 10 is a typical diagram of the second preferred embodiment.

Now, an example of the processing at step S1100 will be descried referring to the typical diagrams of FIG. 9 and FIG. 10. In a video encoding, a screen is divided into the size of a template and a motion vector is obtained for each template. The case where a screen 24 is divided into the templates of "8×6=48" is shown in FIG. 10. Moreover, an object 23-1 is contained in the screen 24, and an object 23-1 exists outside of the narrow search range 21 mentioned above, and has a motion in the range in the wide search range 22. Now, the case where the level-moving are being carried out on the drawing from the upper-left to the lower-right is assumed.

In this case, although the motion vectors of six templates 43, 44, 45, 51, 52, and 53 that all are completely contained in an object 23-1, shall be identically detected, these motion vectors cannot be obtained with the first preferred embodiment if searching the wide search range 22 is not performed.

In this embodiment, in the search of the first area, using the same motion vector with the motion vector to a template on the left of the template to be evaluated as an initial value for the search (step S1100), the narrow search range 74 (e-pixel×f-line) centering the block 73 (a-pixel×b-line) therein, which corresponds to this motion vector is searched. Specifically, in the search of the motion vector in a template 44, the block corresponding to the motion vector of a template 43 (the predicted motion vector) is used as the initial value of the search. Furthermore, after that, in the processing to obtain the motion vectors of the templates to be evaluated, by sequentially using the motion vectors of the adjoining templates on the left as initial values of the search, the same processing is performed as the first preferred embodiment.

As the result, if the pixel block shown by the detected motion vector does not exist in the circumference section of the area 74, and the result of the searching operation for this motion vector is smaller than a predetermined threshold value, the searching is ended. In addition, although, in many cases, a threshold value is set up before starting the search, a threshold value can also be changed in the middle of the search. When the pixel block shown by the motion vector, exists in the circumference section of the area 74 or when the operational result for the motion vector is larger than a predetermined threshold value, the area 22 is searched for the first time.

In this preferred embodiment, as an example, the search is performed in the searching range that centers the block that corresponds to the motion vector that is obtained as the motion vector of the template on the left of the template to be evaluated as an initial value at step S1100. The search may be conducted at any search range that centers the block corresponding to the motion vector that is obtained for the template of any one of the upper left, the upper, the upper right, the lower left, the lower or the lower right adjacent to the template to be evaluated, as initial value. However, the coding efficiency becomes the best, when searching the narrow search range 74 centering the block 73 corresponding to the motion vector of the template on the left of the template to be evaluated, since the differential values based on the motion vector of the template on the left of the template to be evaluated are encoded in a variable-length coding for motion vectors in general moving-video image coding. In the above-mentioned preferred embodiment, an area which has a high possibility that a motion vector exists is predicted, and the searching the first area is started from the area. The circumference of the motion vector=(0, 0), the circumference that is determined by using the motion vector of the template on the left as an initial value, etc., is thinkable as the area which has a high possibility that a motion vector to be obtained exists. In particular, if the area at the circumference of the motion vector of the template on the left is chosen as the area to be searched as the first area, the differences between the motion vectors of continuous templates become smaller. Therefore, the number of bits after carrying out variable-length coding in video-encoding algorithms, such as MPEG1, MPEG2, and H261, H263, etc., decreases, and the number of bits assignable to other portions increases. Consequently, it is effective in quality of image improving.

Moreover, when the search of the first area is conducted for a template at the circumference area of the motion vector of the template on the left of the concerned template, even if the search of the first area fails because of a large change of motion vectors in the boundary of a moving object, after once the search of the second area detects a motion vector, a motion vector will be able to be detected by the search of the first area from the next adjacent template. For example, an image, wherein a car moves inside a background, may be considered as the image of such a case. With such an image, since the motion vectors of the portion of the background and of the portion of the car differ greatly, when a motion vector changes greatly at a boundary, the motion vector cannot be detected only by searching the first area. Then, the second area is searched to detect the motion vector. After that, the motion vector of the template of the right-hand can be detected only by searching the first area by making the motion vector obtained by the previous search as the initial value.

In addition, in this preferred embodiment, the point that the narrow range for a motion vector is searched first, and the wide range for a motion vector is searched next does not change from the first preferred embodiment. Moreover, any method may be adopted as the searching method.

Apart from that, with regard to the image outputted from a digital VTR for business use and a home VTR, the difference in the noise contained is considerably large. Thus when the level of the noise contained in an image is known beforehand, by setting a big threshold value for the image having a big noise and by setting a small threshold value for the image of a small noise, the coding efficiency improves. When making the motion vector corresponding to the template on the left of the template to be evaluated as the initial value of the search at the first step, by changing a threshold value according to the state of an image, by means of making a threshold value bigger if the operational value, such as an absolute difference value, for the motion vector of the template on the left is large, by means of making a threshold value smaller if the operational value is small, etc., the coding efficiency improves.

By the way, as compared with the second preferred embodiment, it can be mentioned that the first preferred embodiment predicts that the motion vector is (0, 0), and performs a motion vector search by using this as the initial value. In addition, in the second preferred embodiment, it is not a problem at all to form the template as arbitrary forms such as an ellipse, a diamond shape, etc., concerning the enforcement of the present invention. Similarly, it is also possible not to restrict the form of the first and the second areas as a rectangle, but to use arbitrary forms. For the first area, what is necessary is just to make the size thereof be completely contained in the second area, and completely contain more than one pixel block of the same size as the template. In the first or the second preferred embodiment, at the time of the search of the narrow range at the first step, operational values, such as the absolute difference values, of the center position in the range may be transformed by a predetermined method so as to increase a probability to have the center point detected. It may be used as this predetermined method, for example, to subtract a predetermined value from the operational values corresponding to the center. In this way, since a probability to have the motion vector=(0, 0) detected is high, even when the input image is a still picture in which a noise is included, if making the motion vector=(0, 0) as the initial value of the search at the first step, it is hardly influenced by the noise. A probability that the same motion vector as motion vector of the template on the left of the template to be evaluated is detected becomes high in case that the motion vector corresponding to the template on the left of the template to be evaluated is used as the initial value of the search at the first step. Therefore, the coding efficiency of a motion vector itself increases. Furthermore, similarly, by changing the threshold value for ending the search of the first step according to the state of an image, in the case of subtracting a large value for the image with a bigger noise and subtracting a small value for the image with a smaller noise, when the amount of the noise of the image is known beforehand, or in the case of making the motion vector corresponding to the template on the left of the template to be evaluated as the initial value of the search at the first step, by means of subtracting a large value for a bigger operational value of a motion vector noise and by means of subtracting a small value for a smaller operational value of a motion vector, etc., by adopting a suitable transformation method according to the state of the image, furthermore, it is hardly influenced of a noise, or the coding efficiency improves.

Third Preferred Embodiment

Although, like the second preferred embodiment, this preferred embodiment, first, performs a motion vector prediction, and performs a motion vector search using this as an initial value, in this preferred embodiment, as a feature thereof, the initial value is calculated using the information between the frames which exist before and after in a time domain.

Figure 11B:
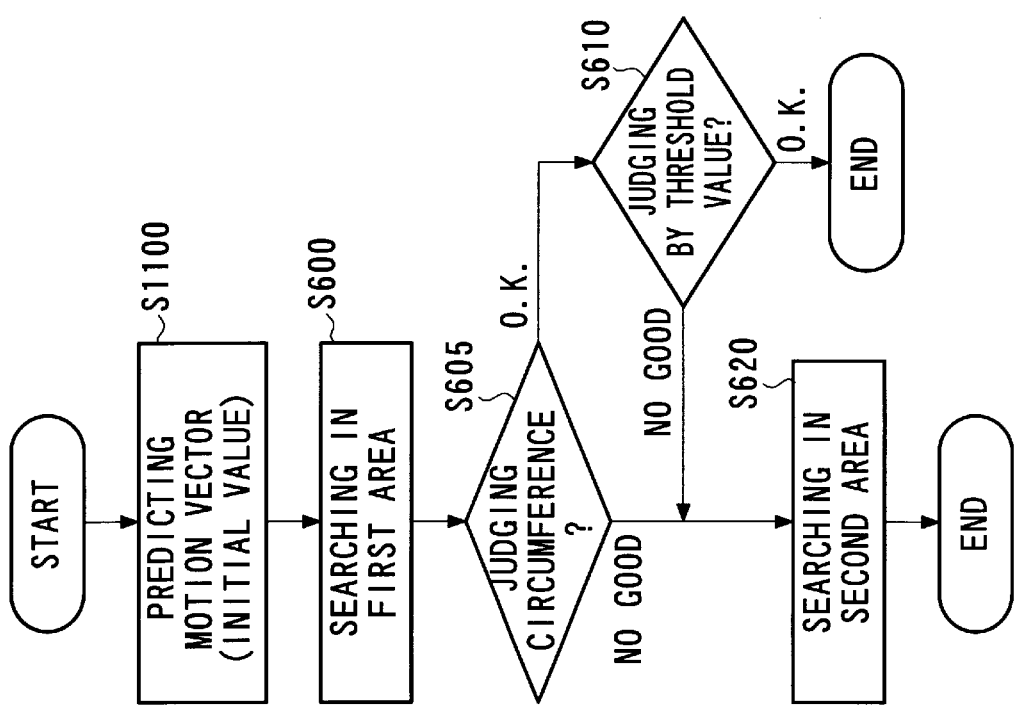

The processing in this preferred embodiment is shown in the flow chart shown by FIG. 11B. From the second preferred embodiment, the contents of the processing in the steps for the prediction of a motion vector (step S1100B; the step corresponding to step S1100 of FIG. 11A) differ, but the other processing does not change.

Specifically at step S1100B, the search processing section 25 uses, as the initial value, the motion vector for the template, which exists at the same position as the template to be evaluated, in other moving-video images which exist in the past in a time domain in the moving-video image containing the template to be evaluated.

Figure 12:
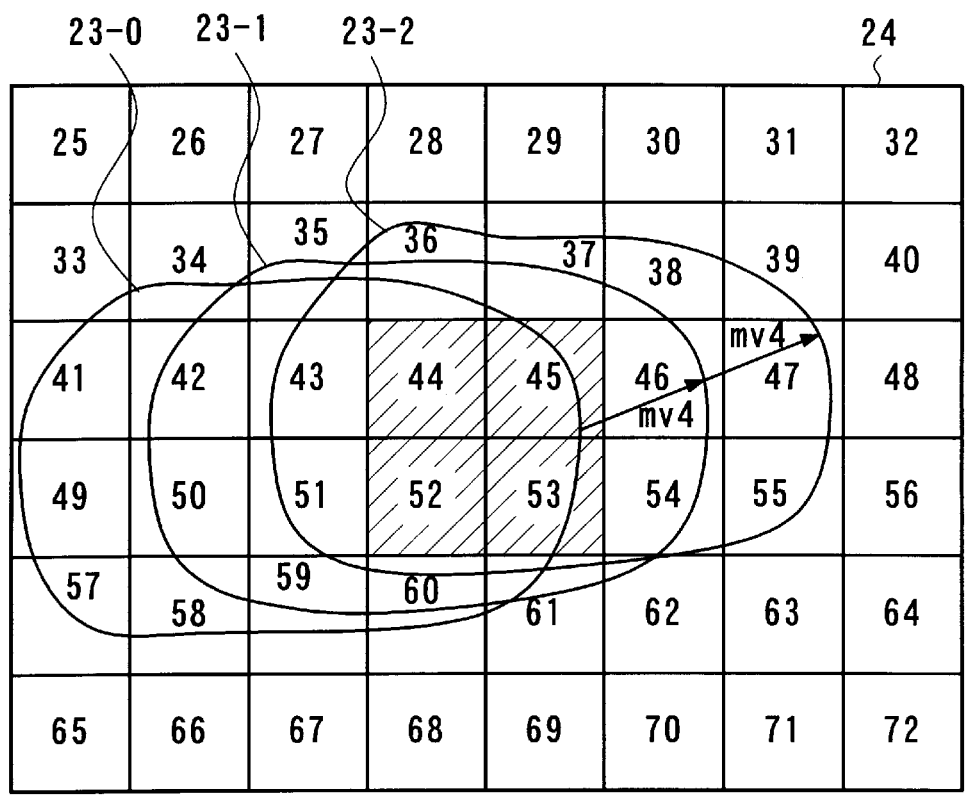
FIG. 12 is a typical diagram of the third preferred embodiment of the present invention.

This will be explained with reference to the typical diagram of FIG. 12. In FIG. 12, the object 23-1, which has been contained on the screen 24 in FIG. 10, exists between the previous screen and the present screen in a time domain. Furthermore, the object 23-1 is moving by the motion vector mv4 between the present screen and the subsequent screen, and exists at the position of an object 23-0 on the previous screen and at the position of an object 23-2 on the subsequent screen.

Then, since four templates 44, 45, 52, and 53 are contained in both objects 23-1 and 23-2, both the motion vectors in the present screen and in the subsequent screen are the motion vectors mv4. If assuming that mv4 has a motion existing outside the narrow search range 21 and within the range in the wide search range 22 as defined in the first preferred embodiment at this time, the motion vectors of four templates 44, 45, 52, and 53 cannot be searched for without searching the wide search range 22 at the search for the subsequent screen, in the first preferred embodiment. However, in this preferred embodiment, it searches the narrow search range centering the motion vector of the template, which exists at the same position with the template to be evaluated, in the previous image in a time domain, wherein the previous image corresponds to the image which includes the template to be evaluated, where a motion vector is searched for in the search of the first area.

As the result, if the pixel block shown by the detected motion vector does not exist in the circumference section of the area, and the result of the searching operation for this motion vector is smaller than a predetermined threshold value, the searching is ended. In addition, although, in many cases, a threshold value is set up before starting the search, a threshold value can also be changed in the middle of the search. When the pixel block shown by the motion vector exists in the circumference section of the area 74 or when the operational result for the motion vector is larger than a predetermined threshold value, the area 22 is searched for the first time.

Therefore, although there is no effect to suppress the dispersion in the motion vectors before/after one screen of the templates 44, 45, 52, and 53 according to this third preferred embodiment, if the searching of the narrow range is only required, it is also possible to reduce the number of operations and to make the motion-vector searching apparatus as the configuration with an electric-power saving function. In addition, in the third preferred embodiment, it is not a problem at all to form the template as arbitrary forms such as an ellipse, a diamond shape, etc., concerning the enforcement of the present invention. Similarly, it is also possible not to restrict the form of the first and the second areas as a rectangle, but to use arbitrary forms. For the first area, what is necessary is just to make the size thereof be completely contained in the second area, and completely contain the same size as the template.

Fourth Preferred Embodiment

The point of performing two kinds of searches in parallel first, and after that, searching for a motion vector is the feature of this embodiment.

Figure 14:
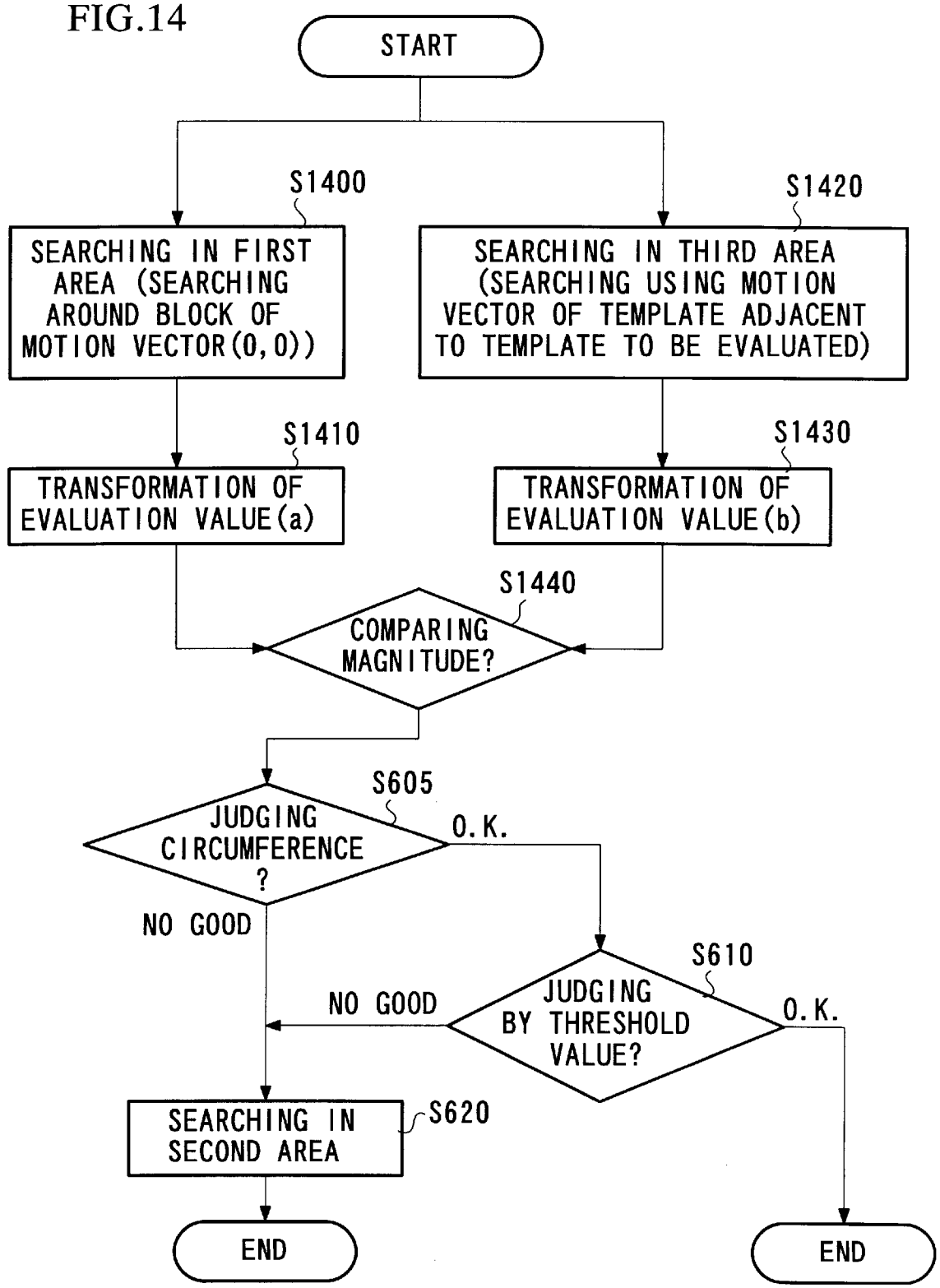
FIG. 14 is a flow chart which shows the processing in the fourth preferred embodiment.

FIG. 14 is a flow chart which shows the processing related to the fourth preferred embodiment, and first, the outline of operations will be explained by this flow chart, and the processing related to this preferred embodiment will be explained by a typical diagram after that.

In addition, steps S1400, S1410, S1420, and S1430 are performed in parallel, respectively. The search processing section 25, to which starting control is carried out by the control section 110 according to given instructions, searches for the motion vector in the first area at step S1400 with reference to the information on the moving-video image which the image memory 30 has memorized. That is, with setting a motion vector to (0, 0), the motion vector searching operation is performed within a pixel block centering this, and the operational result is transformed by a predetermined transformation formula (transformation value a).

At step S1420, on the one hand, the motion vector corresponding to any pixel block which is adjacent to the template to be evaluated is chosen, the third area is searched for a motion vector using the chosen motion vector as an initial value, and the operational result is transformed with a predetermined transformation formula (transformation value b). In addition, according to various images, such as the image of a big motion, and the image of a small motion, both transformation rules shall be defined pertinently, so as to enable adjustment of the detection property of a motion vector.

Next, the search processing section 25 compares the amount of the transformed value and the transformed value b, and uses the motion vector which corresponds to the smaller transformed value (the value having higher likelihood) at step S1440.

Furthermore, at step S605, the search processing section 25 performs a judging for the circumference section, and when the pixel block shown by the obtained motion vector does not exist in the circumference section of the first area (O.K.), it progresses to step S610 and, in the other case (No Good), progresses to step S620.

When it is judged that a sum of absolute difference values is smaller than a threshold value which it determined beforehand at step S610 (O.K.), the search processing section 25 outputs the motion vector which is determined based on the position of the pixel block corresponding to this sum of absolute difference values as a movement origin, through the control section 110, and it ends the processing, and, in the other case (No Good), it progresses to step S620.

And, in the second area which completely contains the first area and third area, the search processing section 25 searches, at step S620, for a motion vector with reference to the information on the moving-video image which the image memory 30 has memorized. The searched motion vector is outputted from the apparatus through the control section 110.

Figure 13:
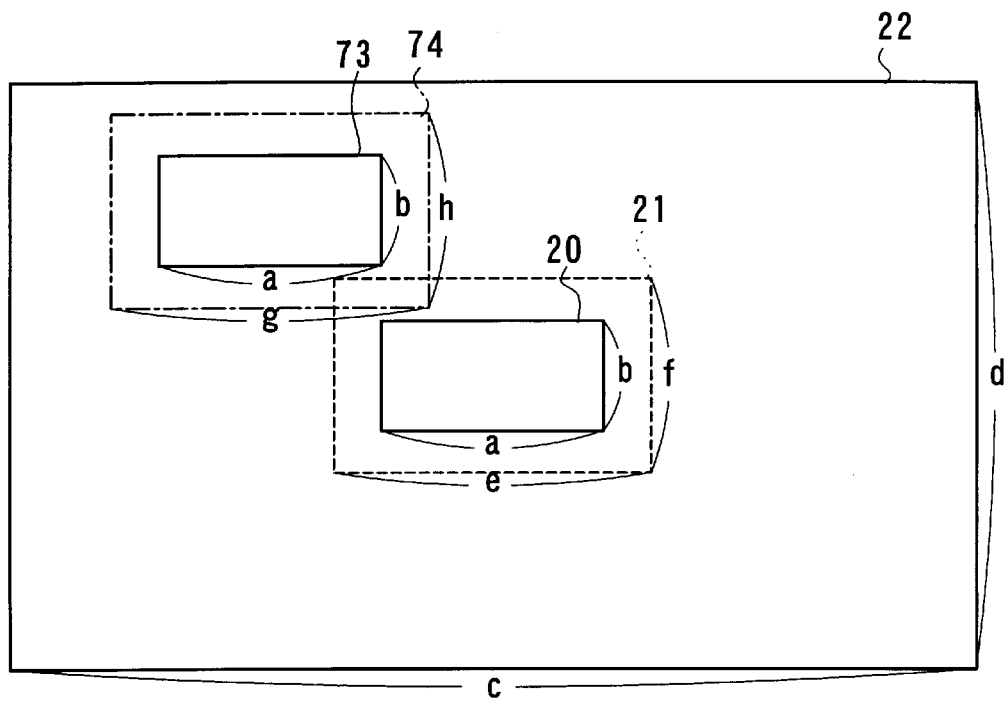
FIG. 13 is a typical diagram of a fourth preferred embodiment of the present invention.

FIG. 13 is a typical diagram. The area 21 is a narrow area (the first area) of e-pixel×f-line ($r \geq e \geq a$, $d \geq f \geq b$) centering the block 20 of the same size as the template of the motion vector=(0, 0). The area 74 is a small area (the third area) of g-pixel×h-line ($c \geq g \geq a$, $d \geq h \geq b$), centering the block 73 (a-pixel×b-line), corresponding to the same motion vector as the motion vector to the template on the left of the template to be evaluated. The area 22 is a large area (the second area) of c-pixel×d-line which contains the area 21 and the area 74, centering the block 20 of the motion vector=(0, 0). First, searching the first and the second areas are performed in parallel. However, when c=e and d=f coincide or c=g and d=h coincide, these cases shall be omitted since the first area and the second area, or the third area and the second area are identical.

Thus, the probability of occurrence of the incorrect detection of a motion vector can be reduced in both the area contained in a background in a moving-video image in which the object moves inside of the still background, and the area contained in an object by performing the search processing parallel at first. The effect that it can aim at the improvement in searching accuracy is obtained.

In addition, in the fourth preferred embodiment, it is not a problem at all to form the template as arbitrary forms such as an ellipse, a diamond shape, etc., concerning the enforcement of the present invention. Similarly, it is also possible not to restrict the form of the first, the second, and the third areas as a rectangle, but to use arbitrary forms. For the first and the third areas, what is necessary is just to make the size thereof be completely contained in the second area, and completely contain a pixel block of the same size as the template.

In addition, each method of searching for a motion vector explained above may be realized by performing a program by a computer, which the program consists of searching procedures and memorized in a storage medium and read by the computer. Of course, it is also possible to be realized as a semiconductor circuit which is manufactured as gate-array, which performs the processing explained above, and processes by only hardware.

When areas of a small motion and a big motion are intermingled in a moving-video image, according to each preferred embodiments which are explained above, for the area of a small motion, the searching range can be narrowed to suppress the dispersion in motion vectors, and the search range can be widened for an area of a big motion.

Moreover, even if two or more blocks move parallel in a fixed direction and the motion is big, by using the motion vector of any one of vectors for the template which are adjacent to the template to be evaluated, the effect to suppress the dispersion in the obtained motion vectors can be attained. Furthermore, when a motion vector is obtained by searching in the narrow range, since it is enough to search only in the narrow range, it can reduce the number of operations, and can configure the motion-vector searching apparatus 100 with an electric-power saving function.

Moreover, it can also reduce the number of operations and can configure the motion vector searching apparatus 100 with an electric-power saving function by carrying out a motion vector search using the motion vector of the template which is at the same position as the template, for which a motion vector is obtained, in a previous image in a time domain. As explained above, according to the present invention, first, between the pixel values of the pixels which comprise the first area and the pixel values of the pixels which comprise the template, a motion vector searching operation is performed, and next, when the operational result satisfies predetermined conditions, a motion vector is searched for based on this operational result, and when this operational result does not satisfy the predetermined conditions on the one hand, between the pixel values of the pixels which comprise the second area and the pixel values of the pixels which comprise the template, a motion vector searching operation is performed to obtain a motion vector. Therefore, the motion vector can be correctly searched for, if the motion vector can be obtained only by searching the first area, the number of operations of the motion vector search can be sharply decrease.

Moreover, since the predetermined conditions are that either value of the sum of absolute difference values as adopted as the operational value, or the sum of the square difference values is below a predetermined value according to a present invention, or, that the pixel block shown by the motion vector does not exist in the circumference section of the first area when assuming that the motion vector is detected by a motion vector searching operation, the effect can be provided that a motion vector can be searched for more correctly and operation can be simplified.

Moreover, the effect that it can aim at the improvement in search accuracy is obtained, cutting down the number of searching operations according to a present invention, since it predicts a certain motion vector and it makes this motion vector that it predicted into the search initial value of the motion vector searching operation in the first step.

Moreover, since it adopts motion vector=(0, 0) which means that there is no motion as a motion vector to predict according to a present invention, it enables to cut down the number of search operations much more in the image of a small motion. Furthermore, since a probability to have the motion vector=(0, 0) detected is high, even when the input image is a still picture in which a noise is included, the effect that it is hardly influenced by the noise is provided.

Moreover, since it adopts the motion vector which can be found to one of the templates which adjoin the template to observe, as a motion vector to predict according to a present invention, the effect that it can aim at the improvement in search accuracy is obtained much more, cutting down the number of searching operations. In particular, when making the motion vector of a template on the left as the initial value of the search at the first step, the probability that the same motion vector as the motion vector of the template on the left side is detected increases. Therefore, it is effective to improve the coding efficiency of the motion vector itself.

Moreover, since it adopts the motion vector to the template to observe and the template which exists in the same position, in other moving-video images which exist in the past in time to the moving-video image containing the template to observe, as a motion vector to predict according to a present invention, the effect that it can perform the motion vector search using the information between frames etc. is obtained.

According to a present invention, a search processing means with reference to the contents of memory of a memory means, between the pixel values of the pixels which comprise the first area and the pixel values of the pixels which comprise the template, a motion vector searching operation is performed, when the operational result satisfies predetermined conditions, a motion vector is obtained from this operational result, when this operational result does not satisfy predetermined conditions, on the one hand, between the pixel values of the pixels which comprise the second area, and the pixel values of the pixels which comprise the template, a motion vector searching operation is performed to obtain the motion vector. Therefore, if only the search in the first area is required, the effect that the apparatus by which the number of operations for the motion vector search can be reduced sharply is obtainable.

The effect that the apparatus by which the number of operations of the motion vector search can be reduced sharply is realizable is obtained.

It can carry out a present invention in other various forms, without deviating from the soul or staple features. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for searching for a motion vector in a moving-video image about a template to be evaluated, by evaluating motion by a predetermined operation between the template and a group of pixel blocks of the same size as the template, comprising:

a first step for assuming a first area having a size of more than one pixel block, and for performing a motion vector searching operation between pixel values of pixels consisting of the first area and pixel values of pixels consisting of said template; and a second step, if the operational result satisfying a predetermined condition, for obtaining a motion vector from the operational result, if the operation result not satisfying said predetermined condition, for assuming a second area of a size completely to cover said first area, and for performing a motion vector searching operation between pixel values of pixels consisting of the second area, and pixel values of pixels consisting of said template, to obtain a motion vector, wherein said predetermined condition is that one of a sum of absolute difference values and a sum of square difference values, being calculated in said motion vector searching operation, is below a predetermined values, and when assuming that said motion vector is detected by said motion vector searching operation, the pixel block defined by the motion vector does not exist in a circumference section of said first area.

2. The method according to claim 1, further comprises a third step for predicting a certain motion vector, and for setting the predicted motion vector as a searching initial value for said motion vector searching operation in said first step.

3. The method according to claim 2, further comprises a fourth step for transforming a value calculated in said motion vector searching operation according to a predetermined rule so as to increase a probability to have said searching initial value detected in said operation.

4. The method according to one of claim 2, wherein said predicted motion vector being predicted in said third step is a vector (0, 0) corresponding to motionlessness.

5. The method according to claim 2, wherein said predicted motion vector being predicted in said third step is a motion vector among motion vectors being already obtained for templates adjacent to said template to be evaluated.

6. The method according to claim 3, wherein said predicted motion vector being predicted in said third step is a motion vector among motion vectors being already obtained for templates adjacent to said template to be evaluated.

7. The method according to claim 5, wherein templates on left-hand side of said template to be evaluated are adopted as said templates adjacent to said template to be evaluated.

8. The method according to claim 6, wherein templates on left-hand side of said template to be evaluated are adopted as said templates adjacent to said template to be evaluated.

9. The method according to one of claims 7, wherein, according to a value calculated in the motion vector searching operation for the adjacent template on left-hand side of the template to be evaluated, a threshold value as a criterion for the searching operation of said first step is changed under a predetermined rule, or a transformation rule in said fourth step is changed, or both the threshold value and the transformation rule are changed simultaneously.

10. The method according to one of claims 2, wherein a motion vector being obtained for a template existing at a position corresponding to a position of the template to be evaluated, in another image existing in the past, in a time domain, of an image including the template to be evaluated is adopted as the predicted motion vector.

11. A method for searching for a motion vector according to claim 1, wherein a searching accuracy of said second step is made to be lower than a searching accuracy of said first step by means of using a whole search method for the searching operation in said first step and using a sub-sampling method or a telescopic searching method for the searching operation in said second step.

12. The method according to claim 3, wherein said predicted motion vector being predicted in said third step is a vector (0, 0) corresponding to motionlessness.

13. The method according to claim 3, wherein a motion vector being obtained for a template existing at a position corresponding to a position of the template to be evaluated, in another image existing in the past, in a time domain, of an image including the template to be evaluated is adopted as the predicted motion vector.

14. The method according to claim 8, wherein, according to a value calculated in the motion vector searching operation for the adjacent template on left-hand side of the template to be evaluated, a threshold value as a criterion for the searching operation of said first step is changed under a predetermined rule, or a transformation rule in said forth step is changed, or both the threshold value and the transformation rule are changed simultaneously.

15. The method according to claim 11, further comprises a fourth step for transforming a value calculated in said motion vector searching operation according to a predetermined rule so as to increase a probability to have said searching initial value detected in said operation.

16. The method according to claim 11, wherein said predicted motion vector being predicted in said third step is a vector (0, 0) corresponding to motionlessness.

17. The method according to claim 11, wherein said predicted motion vector being predicted in said third step is a motion vector among motion vectors being already obtained for templates adjacent to said template to be evaluated.

18. The method according to claim 11, wherein a motion vector being obtained for a template existing at a position corresponding to a position of the template to be evaluated, in another image existing in the past, in a time domain, of an image including the template to be evaluated is adopted as the predicted motion vector.

19. The method according to claim 15, wherein said predicted motion vector being predicted in said third step is a vector (0, 0) corresponding to motionlessness.

20. The method according to claim 15, wherein a motion vector being obtained for a template existing at a position corresponding to a position of the template to be evaluated, in another image existing in the past, in a time domain, of an image including the template to be evaluated is adopted as the predicted motion vector.

21. The method according to claim 15, wherein said predicted motion vector being predicted in said third step is a motion vector among motion vectors being already obtained for templates adjacent to said template to be evaluated.

22. The method according to claim 17, wherein templates on left-hand side of said template to be evaluated are adopted as said templates adjacent to said template to be evaluated.

23. The method according to claim 21, wherein templates on left-hand side of said template to be evaluated are adopted as said templates adjacent to said template to be evaluated.

24. The method according to claim 22, wherein, according to a value calculated in the motion vector searching operation for the adjacent template on left-hand side of the template to be evaluated, a threshold value as a criterion for the searching operation of said first step is changed under a predetermined rule, or a transformation rule in said forth step is changed, or both the threshold value and the transformation rule are changed simultaneously.

25. The method according to claim 23, wherein, according to a value calculated in the motion vector searching operation for the adjacent template on left-hand side of the template to be evaluated, a threshold value as a criterion for the searching operation of said first step is changed under a predetermined rule, or a transformation rule in said forth step is changed, or both the threshold value and the transformation rule are changed simultaneously.

26. A method for searching for a motion vector in a moving-video image about a template to be evaluated, by evaluating motion by a predetermined operation between the template and group of pixel blocks of the same size as the template, comprising:

a first step for obtaining a motion vector by assuming a first area having a size of more than one pixel block and including a pixel block of a motion vector of (0, 0), and by performing a motion vector searching operation, using a vector (0, 0) as an initial value, between pixel values of pixels consisting of the first area and pixel values of pixels consisting of said template, and for obtaining another motion vector by performing said motion vector searching operation for a third area, using a vector obtained for any one of templates adjacent to the template to be evaluated as an initial value; and a second step, if one of said two operational results, being selected by a predetermined rule, satisfying a predetermined condition, for obtaining a motion vector from the operational result, if the operational result not satisfying said predetermined condition, for assuming a second area of a size completely to cover said first area and said third area, and for performing a motion vector searching operation between pixel values of pixels consisting of the second area, and pixel values of pixels consisting of said template, to obtain a motion vector, wherein said predetermined condition is that one of a sum of absolute difference values and a sum of square difference values, being calculated in said motion vector searching operation, is below a predetermined value, and when assuming that said motion vector is detected by said motion vector searching operation, the pixel block defined by the motion vector does not exist in a circumference section of said first area.

27. An apparatus for searching for a motion vector in a moving-video image about a template to be evaluated, by evaluating motion by a predetermined operation between the template and a group of pixel blocks of the same size as the template, comprising;

a memory means for memorizing a moving-video image; and a search processing means for performing motion vector search with reference to memory contents of the memory means, wherein the search processing means is comprised of means for assuming a first area having a size of more than one pixel block, and for performing a motion vector searching operation between pixel values of pixels consisting of the first area and pixel values of pixels consisting of said template, and means, if the operational result satisfying a predetermined condition, for obtaining a motion vector from the operational result, if the operational result not satisfying said predetermined condition, for assuming a second area of a size completely to cover said first area, and for performing a motion vector searching operation between pixel values of pixels consisting of the second area, and pixel values of pixels consisting of said template, to obtain a motion vector, wherein said predetermined condition is that one of a sum of absolute difference values and a sum of square difference values, being calculated in said motion vector searching operation, is below a predetermined value and when assuming that said motion vector is detected by said motion vector searching operation, the pixel block defined by the motion vector does not exist in a circumference section of said first area.

28. An apparatus for video-encoding, comprising: the apparatus for searching for a motion vector defined in claim 27; input means for inputting control instructions into said search processing means; and output means for outputting a searching result from said search processing means.

29. An apparatus for searching for a motion vector in a moving-video image about a template to be evaluated, by evaluating motion by a predetermined operation between the template and group of pixel blocks of the same size as the template, comprising:

a memory means for memorizing a moving-video image; and a search processing means for performing motion vector search with reference to memory contents of the memory means, wherein the search processing means is comprised of means for obtaining a motion vector by assuming a first area having a size of more than one pixel block and including a pixel block of a motion vector of (0, 0), and by performing a motion vector searching operation, using a vector (0, 0) as an initial value, between pixel values of pixels consisting of the first area and pixel values of pixels consisting of said template, and for obtaining another motion vector by performing said motion vector searching operation for a third area, using a vector obtained for any one of templates adjacent to the template to be evaluated as an initial value, and means, if one of said two operational results, being selected by a predetermined rule, satisfying a predetermined condition, for obtaining a motion vector from the operational result, if the operational result not satisfying said predetermined condition, for assuming a second area of a size completely to cover said first area and said third area, and for performing a motion vector searching operation between pixel values of pixels consisting of the second area, and pixel values of pixels consisting of said template, to obtain a motion vector, wherein said predetermined condition is that one of a sum of absolute difference values and a sum of square difference values, being calculated in said motion vector searching operation, is below a predetermined value, and when assuming that said motion vector is detected by said motion vector searching operation, the pixel block defined by the motion vector does not exist in a circumference section of said first area.

30. An apparatus for video-encoding, comprising: the apparatus for searching for a motion vector defined in claim 29; input means for inputting control instructions into said search processing means; and output means for outputting a searching result from said search processing means.

31. An apparatus for searching for a motion vector in a moving-video image about a template to be evaluated, by evaluating motion by a predetermined operation between the template and a group of pixel blocks of the same size as the template, comprising:

a first means for assuming a first area having a size of more than one pixel block, and for performing a motion vector searching operation between pixel values of pixels consisting of the first area and pixel values of pixels consisting of said template;

a second means, if the operational result satisfying a predetermined condition, for obtaining a motion vector from the operational result, if the operational result not satisfying said predetermined condition, for assuming a second area of a size completely to cover said first area, and for performing a motion vector searching operation between pixel values of pixels consisting of the second area, and pixel values of pixels consisting of said template, to obtain a motion vector;

a third means for predicting a certain motion vector, and for setting the predicted motion vector as a searching initial value for said motion vector searching operation by said first means; and a fourth means for transforming a value calculated in said motion vector searching operation according to a predetermined rule so as to increase a probability to have said searching initial value detected in said operation, wherein said predetermined condition is that one of a sum of absolute difference values and a sum of square difference values, being calculated in said motion vector searching operation, is below a predetermined value, and when assuming that said motion vector is detected by said motion vector searching operation, the pixel block defined by the motion vector does not exist in a circumference section of said first area.

32. An apparatus for video-encoding, comprising: the apparatus for searching for a motion vector defined in claim 31; input means for inputting control instructions into said search processing means; and output means for outputting a searching result from said search processing means.

33. A storage medium for memorizing a motion vector searching program which makes a computer perform processes for searching for a motion vector in a moving-video image about a template to be evaluated, by evaluating motion by a predetermined operation between the template and a group of pixel blocks of the same size as the template, the program comprising:

a process for assuming a first area having a size of more than one pixel block, and for performing a motion vector searching operation between pixel values of pixels consisting of the first area and pixel values of pixels consisting of said template; and a process, if the operational result satisfying a predetermined condition, for obtaining a motion vector from the operational result, if the operational result not satisfying said predetermined condition, for assuming a second area of a size completely to cover said first area, and for performing a motion vector searching operation between pixel values of pixels consisting of the second area, and pixel values of pixels consisting of said template, to obtain a motion vector, wherein said predetermined condition is that one of a sum of absolute difference values and a sum of square difference values, being calculated in said motion vector searching operation, is below a predetermined value, and when assuming that said motion vector is detected by said motion vector searching operation, the pixel block defined by the motion vector does not exist in a circumference section of said first area.

34. A storage medium for memorizing a motion vector searching program which makes a computer perform processes for searching for a motion vector in a moving-video image about a template to be evaluated, by evaluating motion by a predetermined operation between the template and a group of pixel blocks of the same size as the template, the program comprising:

a process for obtaining a motion vector by assuming a first area having a size of more than one pixel block and including a pixel block of a motion vector of (0,0), and by performing a motion vector searching operation, using a vector (0, 0) as an initial value, between pixel values of pixels consisting of the first area and pixel values of pixels consisting of said template, and for obtaining another motion vector by performing said motion vector searching operation for a third area, using a vector obtained for any one of templates adjacent to the template to be evaluated as an initial value; and a process, if one of said two operational results, being selected by a predetermined rule, satisfying a predetermined condition, for obtaining a motion vector from the operational result, if the operational result not satisfying said predetermined condition, for assuming a second area of a size completely to cover said first area and said third area, and for performing a motion vector searching operation between pixel values of pixels consisting of the second area, and pixel values of pixels consisting of said template, to obtain a motion vector, wherein said predetermined condition is that one of a sum of absolute difference values and a sum of square difference values, being calculated in said motion vector searching operation, is below a predetermined value, and when assuming that said motion vector is detected by said motion vector searching operation, the pixel block defined by the motion vector does not exist in a circumference section of said first area.

35. A storage medium for memorizing a motion vector searching program which makes a computer perform processes for searching for a motion vector in a moving-video image about a template to be evaluated, by evaluating motion by a predetermined operation between the template and a group of pixel blocks of the same size as the template, the program comprising:

a first process for assuming a first area having a size of more than one pixel block, and for performing a motion vector searching operation between pixel values of pixels consisting of the first area and pixel values of pixels consisting of said template;

a second process, if the operational result satisfying a predetermined condition, for obtaining a motion vector from the operational result, if the operational result not satisfying said predetermined condition, for assuming a second area of a size completely to cover said first area, and for performing a motion vector searching operation between pixel values of pixels consisting of the second area, and pixel values of pixels consisting of said template, to obtain a motion vector;

a third process for predicting a certain motion vector, and for setting the predicted motion vector as a searching initial value for said motion vector searching operation in said first process; and a fourth process for transforming a value calculated in said motion vector searching operation according to a predetermined rule so as to increase a probability to have said searching initial value detected in said operation, wherein said predetermined condition is that one of a sum of absolute difference values and a sum of square difference values, being calculated in said motion vector searching operation, is below a predetermined value, and when assuming that said motion vector is detected by said motion vector searching operation, the pixel block defined by the motion vector does not exist in a circumference section of said first area.

\* \* \* \* \*